United States Patent [19]

Henneberger et al.

[11] 4,456,951

[45] Jun. 26, 1984

[54] NUMERICAL MACHINE TOOL CONTROL

[75] Inventors: Helga Henneberger, Höchstadt; Christian Seeliger, Grossenseebach; Siegfried Wisser, Erlangen, all of Fed. Rep. of Germany

[73] Assignee: Siemens Aktiengesellschaft, Munich, Fed. Rep. of Germany

[21] Appl. No.: 310,985

[22] Filed: Oct. 13, 1981

[30] Foreign Application Priority Data

Oct. 23, 1980 [DE] Fed. Rep. of Germany ....... 3040008

[51] Int. Cl.³ .................... G06F 15/46; G06F 15/16; G05B 23/02
[52] U.S. Cl. .................... 364/131; 364/167; 364/200; 364/186; 371/16
[58] Field of Search ............. 364/131, 132, 133, 136, 364/184, 186, 474, 475, 200 MS File, 900 MS File, 167–171; 371/16, 17, 18, 29

[56] References Cited

U.S. PATENT DOCUMENTS

| 3,829,842 | 8/1974 | Langdon et al. | 364/186 X |
| 4,161,027 | 7/1979 | Russell | 364/186 X |
| 4,167,786 | 9/1979 | Miller et al. | 364/186 X |
| 4,251,858 | 2/1981 | Cambigue et al. | 364/186 X |
| 4,263,647 | 4/1981 | Merrell et al. | 364/186 X |

Primary Examiner—Joseph F. Ruggiero
Attorney, Agent, or Firm—Kenyon & Kenyon

[57] ABSTRACT

A numerical machine tool control has several processors. A monitoring circuit is associated with each processor which, upon the appearance of a predetermined address, interrupts the address stepping action in all processors by an interrupt command with highest priority and switches to the servicing mode. The stored data assigned to the respective addresses and the states of the overall system can be interrogated successively from the operating panel and changed, if necessary.

3 Claims, 2 Drawing Figures

NUMERICAL MACHINE TOOL CONTROL

BACKGROUND OF THE INVENTION

This invention relates to a numerical machine tool control consisting of a multiple processor system and at least one operating panel for input of data and/or commands, in which control states can be interrogated and displayed for diagnostic and servicing purposes.

Computer controls for machine tools have been known for some time (see Siemens-Zeitschrift 1977, No. 8, pages 586–592, for example).

Ancillary devices for servicing and diagnosis are usually provided in such controls for improved operating safety. In one known control, for instance, the central processing unit is provided with a connecting point over which data traffic with the processor can be transacted independently of the central data bus and, hence, independently of the peripheral equipment. The following operations, for example, are possible via appropriate operating and indicating elements: reading and writing of memory cells, stopping the computer upon a certain command, and individual steps in the program.

There are controls today which employ several processors, such as for position computation, interpolation, etc. Provided within the scope of such a multiple processor system always is a so-called master processor which coordinates the individual processors. It is an object of the present invention to be able, in a simple manner, to call up and indicate, in a control with several processors, the state of the overall system at a preselectable point or points of the running program for servicing and diagnostic purposes.

SUMMARY OF THE INVENTION

According to the invention, this problem is solved by providing each processor with a monitoring circuit which receives the addresses or other processing data to be monitored from its associated processor and can be pre-set to a predetermined address or other predetermined datum from the operating panel. The term "pre-set address" will be used for this data hereafter. Upon each appearance of the pre-set address in the respective processor, the respective monitoring circuit transmits to all processors, via a central bus, an interrupt command which stops the address stepping action of all processors and switches them to a status interrogation mode in which they can be interrogated from the operating panel.

In this manner, the status of the overall system can be interrogated from the operating panel at a predetermined point in the running program of each processor.

DETAILED DESCRIPTION OF THE INVENTION

Figure 1:
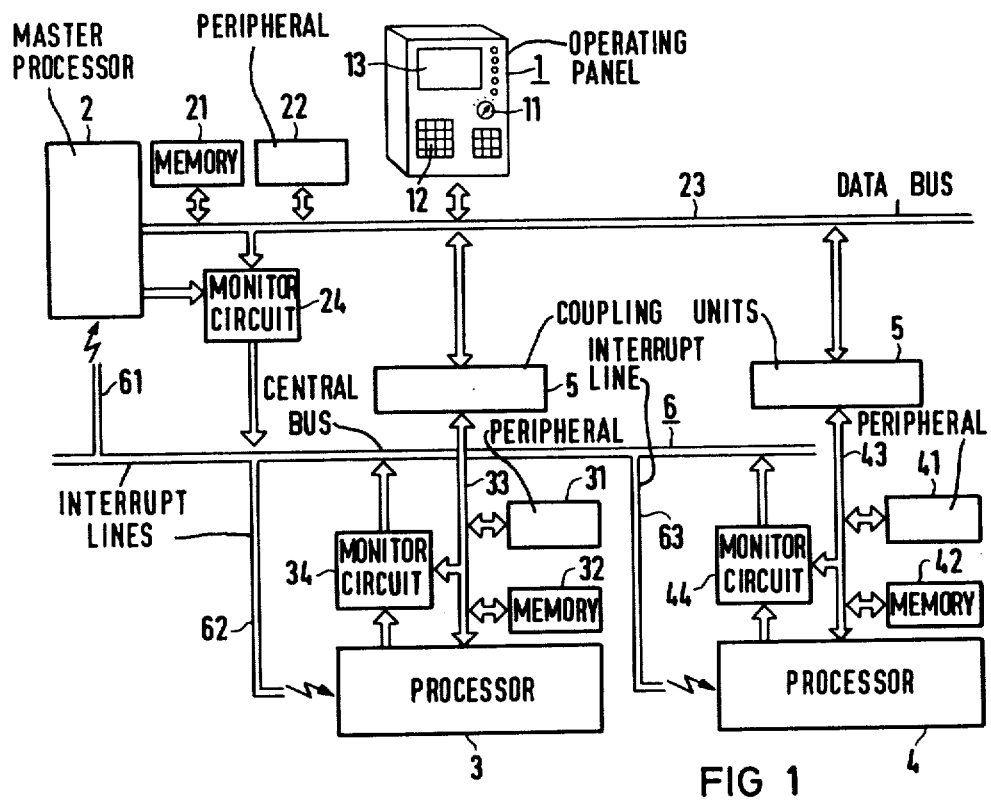
FIG. 1 shows the basic circuit diagram of a multiple processor control having an interrupt in accordance with the teachings of the invention.

A numerical control, in accordance with the invention, consists of master processor 2 which coordinates the overall system and to whose data bus 23 are connected memories 21, peripheral equipment 22, and an operating panel 1. Operating panel 1 has keyboard 12 and display 13 for the input of commands and/or data.

Also provided on operating panel 1 is operating mode selector switch 11, by means of which switching from numerical controlled (NC) operation to servicing is possible. Bus 23 of master processor 2 is connected via coupling units 5 and buses 33 and 43 to processor 3 which serves, for example, for the computation of interpolation values and to processor 4 which serves for the control of travel distance and position. Also associated with each of these processors 3 and 4 and connected thereto by bus 23, etc., are peripheral apparatus 31 and 41, respectively, and memories 32 and 42, respectively.

When operating mode selector switch 11 is on "servicing", the contents of any register and memory of processors 2, 3, and 4 can be displayed in display 13; diagnostic commands such as set stop point, select registers and memories, and/or single step, are put in through keyboard 12, being appropriately addressed to particular elements of the system.

In order to be able to stop the entire system at any address or other predetermined datum of a processor, a monitoring circuit 24, 34 and 44 is associated with each processor 2, 3, 4, respectively. Each monitoring circuit can be pre-set to a monitor command, for example, a particular address, from operating panel 1. Each monitoring circuit then continuously compares the pre-set address with the actual address that happens to be in its associated processor. When during the running of the program, the pre-set address is reached, the respective monitoring circuit, say 44, gives an address stop command to central bus 6. Bus 6 is common to all monitoring circuits being connected to the output of each one. From there an interrupt command of highest priority is transmitted to each processor via interrupt lines 61, 62 and 63. The interrupt command switches the processors to the servicing field routine and stops the address stepping action. This causes each processor to remain in the state which it has just reached. In this manner, the memory contents and states of the entire system associated with the respective processors can be successively interrogated, displayed and, if necessary, changed through operating panel 1.

Figure 2:
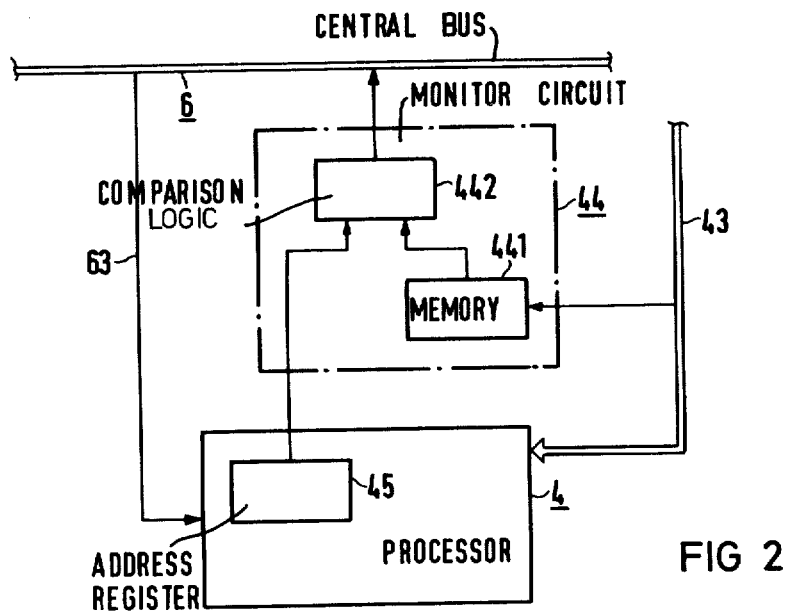
FIG. 2 is a schematic drawing of an embodiment of a listening-in circuit.

The monitoring circuit shown in FIG. 2, e.g., monitor circuit 44, essentially consists of memory 441, which can be loaded via data bus 23, coupling unit 5 and bus 43, with an address from operating panel 1, and of comparator 442, to whose inputs are connected memories 441 and address register 45 of processor 4. If the addresses are in agreement, the comparison logic of comparator 442 will give the interrupt command via control bus 6. At the same time, the stop address is transmitted to operating panel 1 and displayed. Optionally, also, the processor which triggered the alarm is also identified to the operating panel.

With the monitoring circuit of the invention, it is possible, under some circumstances, not only to stop the running program as a function of a certain address, but also, if desired, as a function of the appearance of certain data. For this purpose, the comparison logic may be connected, for instance, to the data bus or to an accumulator of the processor. In such a case, the memory is provided with an appropriate data word from operating panel 1 instead of an address.

It should be mentioned that the monitoring circuit and the address stop may also be activated outside of the actual servicing field routine; furthermore, the monitoring circuit may be designed so that the interrupt command is transmitted only after repeated appearances of the pre-set address.

What is claimed is:

1. A numerical machine tool control system of the type having at least two processors, a data bus interconnecting the processors, and an operating panel connected to the data bus for supplying at least one of data and commands, and for interrogation and display of operating states of the control system, the control system further comprising:
    an interrupt input in each processor for receiving input data, and an output in each processor for providing signals to be monitored, said input data including at least one pre-set address for at least one of the processors;
    a central bus coupled to said interrupt input of each processor; and
    a monitor for each processor, each monitor having an input coupled to said output of a respective processor for receiving said signals to be monitored of said respective processor, an input coupled to the data bus for receiving a pre-set address from the operating panel, and an output for coupling an interrupt signal to said central bus, the monitor generating an interrupt signal when said pre-set address and said signal to be monitored are in agreement.

2. A numerical machine tool control in accordance with claim 1 in which each processor has an address register and in which each monitor comprises:
    a memory for storing a pre-set address at which the respective processor is to be stopped; and
    a comparator to which the contents of the memory and of the address register in the associated processor are fed as inputs, the comparator generating the interrupt signal to the central bus.

3. A numerical machine tool control in accordance with claim 1 in which each monitor further comprises:
    means coupled to the output of the monitor and to the central bus for accumulating a predetermined number of occurrences of pre-set addresses prior to transmitting an interrupt signal.

* * * * *